United States Patent [19]

Fentress et al.

[11] Patent Number: 5,213,785
[45] Date of Patent: May 25, 1993

[54] CONTINUOUS ANTIMONY PENTOXIDE PRODUCTION

[75] Inventors: Denton C. Fentress, Vinita; Kent E. Mitchell, Bartlesville; Don W. Godbehere, Ochelata; Larry S. Maddox, Bartesville, all of Okla.; Richard E. Lowery, Muscatine, Iowa; Howard F. Efner, Bartlesville, Okla.

[73] Assignee: Phillips Petroleum Company, Bartlesville, Okla.

[21] Appl. No.: 781,532

[22] Filed: Oct. 21, 1991

[51] Int. Cl.$^5$ ............... B01J 13/00; C01G 30/00
[52] U.S. Cl. .................. 423/617; 252/313.1
[58] Field of Search .............. 423/617; 252/313.1

[56] References Cited

U.S. PATENT DOCUMENTS

| | | | |
|---|---|---|---|
| 2,286,992 | 11/1966 | Armeniades | 259/4 |
| 3,917,811 | 11/1975 | Grout et al. | 423/659 |
| 4,022,710 | 10/1977 | Crompton et al. | 252/313 |
| 4,348,301 | 7/1982 | Kobashi et al. | 423/617 |

OTHER PUBLICATIONS

Chemineer bulletins on static mixers, Chemineer, Inc.; 124 Flagship Drive, N. Andover, Mass. 01845 (50-68-7-0101).

Kirk-Othmer Encyclopedia of Chemical Technology, Reactor Technology, vol. 19, pp. 880-883, 3rd ed. (1984).

"The Static Mixer as a Chemical Reactor", T. Bor, Jul. 1971.

Primary Examiner—Wayne Langel
Attorney, Agent, or Firm—Gary L. Haag

[57] ABSTRACT

This invention concerns an improved means of oxidizing aqueous dispersions of antimony trioxide to colloidal hydrous antimony pentoxide in a continuous flow system. The oxidant is hydrogen peroxide and the continuous flow system nominally consists of a static mixer and a tubular reactor.

14 Claims, 2 Drawing Sheets

CONTINUOUS ANTIMONY PENTOXIDE PRODUCTION

BACKGROUND OF THE INVENTION

This invention relates to a process for making antimony pentoxide.

Colloidal antimony pentoxide is frequently used as a metals passivation additive and a specialty fire retardant.

U.S. Pat. No. 4,348,301 discloses a means of making hydrous antimony pentoxide by contacting hydrogen peroxide and an antimony trioxide aqueous slurry in a batch system with and without a stabilizer. The stabilizer is generally an alkanolamine, alkanolamine salt, alpha-hydroxycarboxylic acid or a polyhydroxy alcohol and reportedly functions as a catalyst thereby increasing the reaction rate and producing a colloidal suspension of smaller average particle size. As previously noted, this prior art discloses use of the reaction in a batch reactor system. In such a system, the reactants are initially loaded into a vessel where they are well mixed and remain until the desired degree of conversion is obtained. The resultant mixture is then discharged. While the reaction is ongoing, the composition or degree of conversion is changing with time but at any point within the reactor, the composition is generally uniform. Batch reactors are extremely simple to operate and are frequently used for the preparation of small quantities of specialty chemicals. However batch reactors are limited in throughput capacity, are difficult to scale-up, and are often energy and manpower intensive.

Because of the inherent limitations associated with the operation of a batch reactor, continuous flow processes are frequently preferred when possible. One alternative used by those skilled in the art is to place tank reactors in series wherein the effluent stream from the upstream reactor becomes the influent stream to the downstream reactor. Each tank possesses a reactant of progressively greater conversion and at steady-state conditions, the degree of conversion in each tank becomes a fixed value. However, the residence time of the reactant species in a given tank may differ significantly as reactant which has just entered the tank is mixed with reactant which has been there for a significant period of time. This phenomenom is referred to as back-mixing. The high degree of mixing in each tank assures a uniform overall composition and the effluent from a given tank is representative of the actual composition within the tank. Limitations associated with the tank reactors in series include the need for many tanks when high conversion is desired, the process equipment is expensive to buy and to maintain, the high degree of mixing requires significant energy input, the significant difficulties exist with repsect to process scale-up.

A second approach for a continuous flow reactor system is to inject the reactants into a pipe (i.e., a tubular reactor) of sufficient length and obtain the desired product in the produced effluent. Tubular reactors are easy to design and operate and inexpensive to construct. However, non-uniform velocity distributions, radial temperature gradients and poor radial mixing can limit practical applications when high viscosity fluids are involved. U.S. Pat. No. 4,022,710 discloses hydrous antimony pentoxide production via the reaction of hydrous antimony trioxide with hydrogen peroxide without a stabilizer but in a continuous flow, fixed diameter reactor. The desired antimony trioxide concentration in the feed is stated to be 1 to 20 wt %, with 5 to 10 wt % being preferred. A hydrogen peroxide to antimony trioxide mole ratio of not less than 3 and preferably 5 to 10 is taught. A nominal operating temperature of 90° C. is disclosed. To obtain a colloidal product of desired particle size and to avoid plugging of the reactor, this art discloses the requirement that fluid mixing in the reactor be minimized and that the internals of the reactor be constructed of a non-wetting material. To minimize fluid mixing, the art requires all bends be removed from the system and the operation at flow velocities which minimize fluid mixing. Problems associated with the plugging of the reactor were apparently resolved by constructing the reactor of a non-wetting resin, preferably tetrafluoroethylene, rather than stainless steel. From a practical perspective, these restrictions significantly increase the reactor cost on a per unit throughout basis.

Although the art is silent, the Examples and operational restrictions cited in '710' indicate that process operation was restricted to the laminar flow regime (Reynolds Number <2000) and that these conditions were incorrectly referred to as "plug flow" (a possible Japanese to English translation error). For smooth circular pipes and Newtonian fluids, those skilled in the art recognize a departure from laminar flow conditions when a dimensionless number, $DV\rho/\mu$, is greater than approximately 2000. This dimensionless group is referred to as the Reynolds number wherein D is the pipe diameter, V is the superficial velocity defined as the total volumetric flow rate (Q) divided by the cross-sectional area available to flow (A), $\rho$ is the bulk fluid density, and $\mu$ is the bulk fluid viscosity. The art teaches that a transition zone from laminar to turbulent flow exists for Reynolds Numbers between 2000 and 4000 and that turbulent flow exists at Reynolds Numbers greater than 4000.

When operating in the laminar region, fluid flow is solely in the axial direction and fluid mixing is minimal and primarily by diffusional effects. The lack of mixing restricts heat transfer and can result in nonuniformities in temperature which can result in nonuniformities in reaction rate and product produced. The velocity profile is a maximum at the center of the pipe and decreases in a parabolic manner to zero at the wall. Therefore when a slug of fluid is injected into the pipe, the fluid injected at the center will be produced well before that injected near the wall. When operating at laminar flow conditions, the residence time of a given fluid element when flowing through the pipe will be dependent on the point of injection on the entrance cross-section.

When operating in the turbulent flow regime, chaotic mixing is superimposed on the bulk axial flow. As a result, the velocity profile from the center of the pipe to the wall is nearly constant. This results in nearly uniform compositions and temperatures at a given radial cross-section and all fluid elements will have similar residence times regardless of where injected on the entrance cross section. As assemblage or slug of fluid elements simultaneously injected into the tube at turbulent flow conditions will advance like a plug through the pipe. In the literature, this condition is routinely referred to as "plug flow".

SUMMARY OF THE INVENTION

It is an object of this invention to make high purity colloidal antimony pentoxide.

It is a further object of this invention to conduct the reaction in a continuous manner.

It is yet a further object of this invention to obtain the operational benefits of using a tubular reactor.

And it is still yet a further object that reactor volume, reactor length, and construction and operation costs be minimized on a per unit throughput basis.

In accordance with this invention, a process for the continuous production of colloidal antimony pentoxide by the reaction of hydrogen peroxide with antimony trioxide in a static mixer/tubular reactor flow system is disclosed.

DETAILED DESCRIPTION OF THE INVENTION

Figure 1:
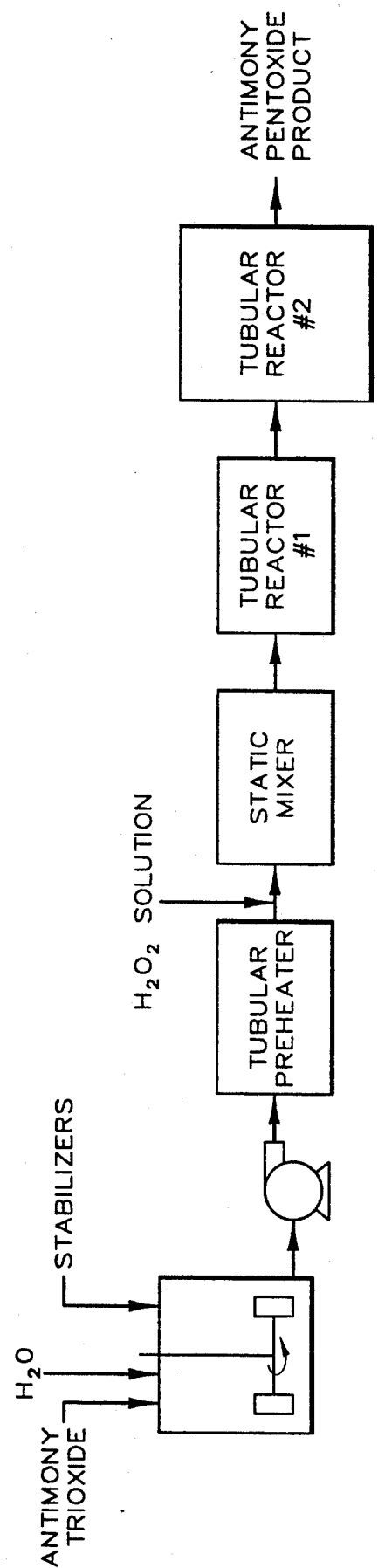
FIG. 1 is a flow diagram for a process capable of continuous antimony pentoxide production.

This invention concerns an improved means of oxidizing antimony trioxide to antimony pentoxide in a continuous flow system by the following reaction.

$$Sb_2O_3 + 2H_2O_2 \rightarrow Sb_2O_5 + 2H_2O$$

The reactant, antimony trioxide has limited solubility in water and primarily exists as a suspended solid in an aqueous-based slurry. The product, hydrous antimony pentoxide, has limited solubility in water and will for the most part, exist in a colloidal form. Hydrous antimony pentoxide hereinafter refers to a metal oxide wherein the antimony metal primarily exists in the +5 oxidization state and may contain waters of association and/or hydration. Colloidal refers to a suspension of discrete matter in a continuous medium wherein the discrete matter possesses at least one dimension in the range of 10 to 1,000 Angstrom.

Key and distinguishing characteristics of this process are (1) the chosen operating conditions (reactant concentrations, temperature, stabilizer etc.), (2) the unique in-situ fluid flow phenomena resulting from the reactor flow system design, and (3) the manner of process start-up and operation.

The viscosity of the antimony trioxide reactant slurry behaves in a non-Newtonian manner. This behavior is demonstrated in Table I wherein the viscosity is observed to decrease as shear rate (RPM) increases. Such non-Newtonian phenomena is referred to as pseudo-plastic behavior and is frequently observed in muds, slurries, and polymer solutions. Tables I and II show that the fluid viscosities of the reactant and product will be significant (i.e., generally greater than 1000 cp). Calculations indicate that at practical operating conditions for flow in open tubes, the Reynolds number for both the reactant and the product streams will be significantly less than 2000 and therefore, fluid flow will be in the laminar or streamline flow regime. (See Example I for calculated Reynolds numbers at representative flow conditions.) Streamline flow implies that mixing in the radial direction is extremely low and as a result an operator faces significant problems when blending reactants and attempting to heat the fluid to a uniform temperature with an external heat transfer fluid. These difficulties may accentuate plugging problems. Design problems were further complicated in the present study by the observation that carbon-steel catalyzes the decomposition of hydrogen peroxide and carbon-steel can be heavily fouled by the colloid product.

In the present invention, the preferred mode for obtaining acceptable product is (1) heating the antimony trioxide aqueous dispersion to the desired process temperature, (2) combining the aqueous dispersion and the hydrogen peroxide reactant immediately upstream of a static mixer, (3) using the static mixer to efficiently mix and initiate the reaction between the high viscosity trioxide-bearing stream and the low viscosity hydrogen peroxide bearing stream, and (4) providing sufficient residence time downstream of the static mixer for 100% conversion.

TABLE I

Viscosity of 31 wt % $Sb_2O_3$ Feedstream[a]

| Shear | Temperature | | |
|---|---|---|---|
|  | 24° C. | 62° C. | 92° C. |
| 20 RPM | 4050 cp | 11300 cp | 17300 cp |
| 50 | 2220 | 5480 | 5720 |
| 100 | 1450 | 2430 | 2830 |

[a]Brookfield Digital Viscometer Model DV-II with #6 spindel.

TABLE II

Viscosity of 8.8 wt % Antimony Pentoxide[a]

| Shear | Temperature | | |
|---|---|---|---|
|  | 25° C. | 61° C.[b] | 91° C.[c] |
| 20 RPM | 1750 cp | 2350 cp | 200 cp |
| 50 | 1640 | 1080 | 180 |
| 100 | 1580 | 195 | 80 |

[a]Brookfield Digital Viscometer Model DV-II with #6 spindel.
[b]Canon-Fenske viscometer value of approximately 550 cp at 54° C.
[c]Data suspect because of skin forming on top of solution.

The flow system nominally consists of a single hydrogen peroxide injection port/static mixer arrangement and a tubular reactor possessing sufficient residence time to insure complete reaction of the antimony trioxide prior to leaving the system. (See FIG. 1). Residence time downstream of the static mixer can be increased by lowering the flowrate or increasing the system volume by increasing the length of the tubular reactors or increasing the diameter of the tubular reactors. For operation simplicity and cost-effectiveness, the latter is preferred. Operation with multiple injection port/static mixer arrangements or static mixers located between downstream tubular reactors to enhance mixing have been successfully demonstrated but because of operational simplicity, the preferred embodiment is a single injection port/static mixer arrangement. It is preferred that the aqueous dispersion be preheated or cooled to the desired process temperature either by batch treatment or flowing through a preheater or chiller. The hydrogen peroxide may or may not be preheated or precooled. If not, it is preferred that the aqueous dispersion be heated above or cooled below the desired process temperature so as to result in an aqueous dispersion/peroxide mixture whose temperature approximates the desired process temperature. Temperature control for the static mixer and tubular reactor can be provided by jacketing said vessels. Because the reaction is exothermic, downstream cooling capabilities are required for accurate temperature control. As noted, the tubular reactor located downstream of the static mixer must possess sufficient residence time to insure complete reaction of the antimony trioxide. The residence time can be reduced somewhat by the inclusion of additional downstream static mixers which break up and mix the fluid stream lines. The preferred material of construction is stainless steel although other non-wetting materials would also be applicable. Upon completion of the reaction, the antimony pentoxide product should be cooled to near room temperature prior to storage, for instance, by flowing through a suitable heat exchanger.

A key factor distinguishing this process from the prior art is the mixing of antimony trioxide slurry and hydrogen peroxide reactant and the accompanying reaction which occurs during said mixing in the static mixer. A static mixer is defined as an in-line, no-moving-part, continuous mixing unit. The energy required for fluid mixing comes from the pressure drop across the unit. When properly designed, the flow characteristics of fluids injected into the mixer approach those of ideal plug flow. Such mixing enables more uniform temperatures and rates of reaction within the mixer and apparently affects the subsequent reaction in the downstream tubular reactor. Although wishing not to be bound by theory, the inclusion of the static mixer in the current processing scheme apparently enhances colloid nucleation and the initial reaction and thereby enables a product of suitable quality to be obtained at conditions not foreseen by the prior art.

The aqueous dispersion of antimony trioxide is prepared by adding antimony trioxide to water. It is preferred that the antimony trioxide particle size be ultrafine and that it contain minimal impurities and inert/unreacted material. The antimony trioxide aqueous slurry should preferably contain 1 to 45 weight percent antimony trioxide, more preferably 10 to 40 weight percent, and most perferably 25 to 35 weight percent antimony trioxide in water. A major advantage of the greater antimony trioxide concentrations is the elimination of or a reduction in the size of any subsequent step for concentrating the hydrous antimony pentoxide.

The reaction can be conducted either with or without a stabilizer. The stabilizer is added primarily to suppress foaming although the benefits reported in '310' in batch systems wherein the stabilizer apparently catalyzes the reaction, enables operation at lower temperatures, and produces a pentoxide product possessing a smaller particle size may also be present in this continuous flow system. Typical stabilizers include the alkanolamines, alkanolamine salts, the alpha-hydroxy carboxylic acids and polyhydroxy alcohols. The preferred stabilizers are the alkanolamine salts because of their additional foam suppression capabilities. The most preferred stabilizer is an alkanolamine salt prepared by adding triethanolamine and phosphoric acid to the aqueous dispersion and thoroughly mixing. The stabilizer concentration should be an amount effective to stabilize foaming and/or catalyze the reaction. Preferable concentrations are 1 to 15 weight percent stabilizer in the aqueous dispersion. For the preferred triethanolamine phosphate stabilizer, the preferred concentration in the aqueous dispersion is 1 to 11 weight percent triethanolamine and 0.3 to 4 weight percent phosphoric acid. In the most preferred mode, about 7 weight percent triethanolamine and about 2 weight percent phosphoric acid are combined in the aqueous dispersion. When using a stabilizer, temperature is not a key parameter. Under such conditions, the process can be operated over a 0° to 150° C. regime. The preferred operating range is 0° to 90° C. When not using stabilizers, a temperature sufficient for appreciable reaction is required. A temperature greater than 90° is generally preferred and most preferred is a temperature in the 90° to 150° C. range. When operating above 100° C., process vessels capable of pressurization are required because of operation above the boiling point of the aqueous dispersion.

Minimally, a stoichiometric amount of hydrogen peroxide must be added to the antimony trioxide. The stoichiometry is 2 moles hydrogen peroxide per 1 mole antimony trioxide. A stoichiometry of 2.0 to 2.5 is preferred. The concentration of hydrogen peroxide in water is not critical but should be sufficient to avoid unnecessary dilution of the antimony pentoxide product. Preferable concentrations are 30 to 40 wt % hydrogen peroxide in water and the most preferred is about 33 wt %.

A potential problem area in the operation of any process is the start-up procedure. To avoid plugging problems, the preferred start-up procedure comprises (1) flowing water through the entire flow system at process conditions, (2) initiating the flow of hydrogen peroxide at the injection port or ports, and finally (3) injecting the antimony trioxide slurry at the aqueous dispersion injection port.

The following examples are provided to illustrate the practice of the invention and are not intended to limit the scope of the invention or the the appended claims in any way.

EXAMPLE I

Figure 2:
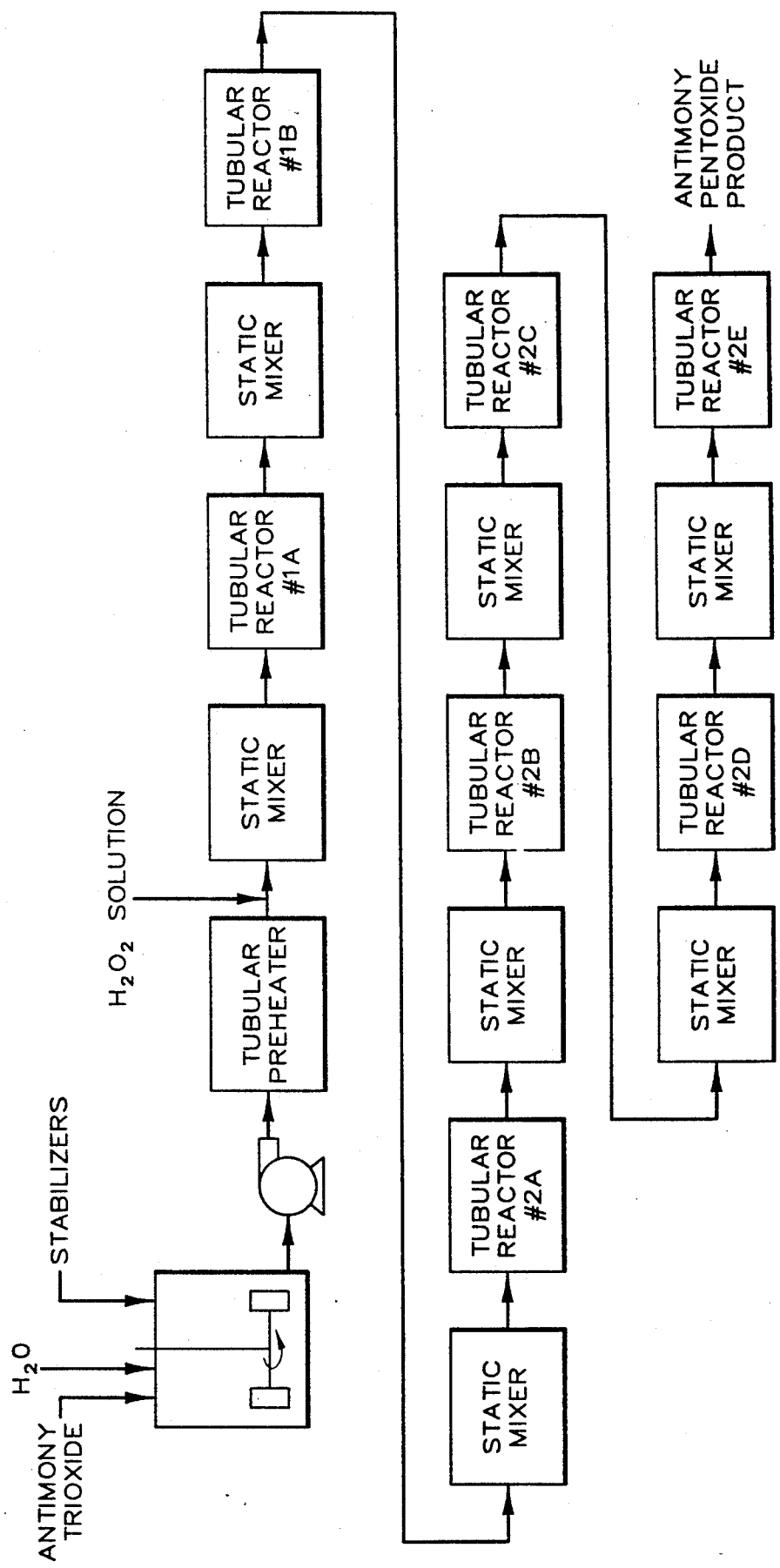
FIG. 2 is a flow diagram for the experimental system of Examples I and II.

A flow diagram for the experimental system used in this Example is presented in FIG. 2. The antimony trioxide slurry was prepared by adding 500.4 pounds antimony trioxide to an aqueous solution consisting of 30 pounds phosphoric acid and 112.6 pounds of triethanolamine. These components were thoroughly mixed in the slurry mix tank. Representative viscosity values of the feedstream are presented in Table I. The lower half of the tank was jacketed and tempered water was run through the jacket to provide slight preheating to the slurry.

The material of construction for the flow system was stainless steel. Prior to contacting with 33 wt % hydrogen peroxide, the slurry was preheated by running through a heat exchanger consisting of forty feet of 0.5 inch diameter tubing inside a pipe jacket. The slurry was pumped using a progressive cavity pump. The temperature of the water in the jacket was controlled so as to heat the slurry to the initial reaction temperature of 85° C. Flowrates were 0.28 gal/min hydrogen peroxide solution and 1.0 gal/min slurry. The molar ratio of hydrogen peroxide to antimony trioxide was 2.15. The hydrogen peroxide was injected immediately upstream of a 12 element Chemineer static mixer sized to ensure good contact between the slurry and the hydrogen peroxide. Upon injection, the viscosity of the slurry was noted to decrease. Assuming a fluid viscosity of 1000 cp, the Reynolds number for the 0.5 in. and 1.5 in. diameter tubular reactors were approximately 10 and 3.6 which is significantly less than 2000 and therefore well into the laminar flow regime.

Referring to FIG. 2, tubular reactors 1A and 1B were 0.5 in. diameter and had respective lengths of 20 and 40 ft. The remaining downstream reactors were each 1.5 in. diameter and 20 ft long. All tubular reactors were jacketed and maintained at a constant temperature. All static mixers were Chemineer 12 element mixers or the equivalent. The respective plug flow residence times in the 0.5 and 1.5 in diameter reactors were about 0.48 and 7.25 min. When operating at 85° C., the reaction was essentially complete after flowing through the 0.5 in diameter tubing. The product was a clear, yellow green liquid and met specification requirements for Phil-Ad ™ CA-6000.

EXAMPLE II

The same conditions were employed as in Example I except the process temperature was reduced to 30° C. Although the reaction was not complete after flow through the 0.5 in. diameter reactor (plug flow residence time of 0.48 min.), 100% conversion was obtained after flow through the 1.5 in. diameter reactor (additional plug flow residence time of about 7.25 min.). The product met specifications for Phil-Ad ™ CA-6000.

EXAMPLE III

The transmittance of a representative product sample was determined using a Hitachi Model 100–20 spectrophotometer. For a 0.53 wt % antimony pentoxide sample, a transmittance of 65.7% was obtained.

That which is claimed is:

1. A continuous process for making colloidal hydrous antimony pentoxide comprising thoroughly mixing with a static mixer a hydrogen peroxide solution and an aqueous dispersion of antimony trioxide in a continuous manner so as to initiate a reaction between the hydrogen peroxide solution and aqueous dispersion of antimony trioxide, and flowing said mixture into a tubular reactor possessing sufficient residence time for quantitative conversion of the trioxide to pentoxide.

2. A continuous process according to claim 1 wherein the process temperature is nominally 90° C.

3. A continuous process according to claim 1 wherein the hydrogen peroxide to antimony trioxide molar ratio is 2.0 to 2.50.

4. A continuous process according to claim 1 wherein the concentration of antimony trioxide in the feedstream is 25 to 35 wt %.

5. A continuous process according to claim 1 wherein the aqueous dispersion is heated to the desired process temperature prior to flowing through the static mixer.

6. A continuous process according to claim 1 additionally comprising the startup steps of: (a) injecting water into the flow system at the aqueous dispersion injection port and the hydrogen peroxide injection port; (b) converting to injection of said hydrogen peroxide at said hydrogen peroxide injection port; (c) following step (b), converting to injection of said aqueous dispersion at said aqueous dispersion injection port.

7. A continuous process according to claim 1 wherein said aqueous dispersion further comprises a stabilizer selected from the group consisting of alkanolamines, alkanolamine salts, alpha-hydroxycarboxylic acids, polyhydroxy alcohols and mixtures thereof.

8. A continuous process according to claim 7 wherein the process temperature is 0° to 90° C.

9. A continuous process according to claim 7 comprising the additional step of heating the aqueous dispersion to the desired process temperature prior to flowing through the static mixer.

10. A continuous process according to claim 7 wherein the hydrogen peroxide to antimony trioxide molar ratio is 2.0 to 2.50.

11. A continuous process according to claim 7 wherein the concentration of antimony trioxide in the feedstream is 25 to 35 wt %.

12. A continuous process for making colloidal antimony pentoxide comprising throughly mixing with a static mixer a hydrogen peroxide solution and an aqueous dispersion of antimony trioxide in a continuous manner as to initiate a reaction between the hydrogen peroxide solution and aqueous dispersion of antimony trioxide, and flowing said mixture into a reactor flow system comprising static mixers and tubular reactors arranged sequentially and in the alternate and which in combination possess sufficient residence time for quantitative conversion of the trioxide to the pentoxide.

13. A continuous process for making colloidal hydrous antimony pentoxide comprising the steps of:
   (a) mixing an aqueous dispersion consisting essentially of 25 to 35 wt. % antimony trioxide, 3 to 11 wt. % triethanolamine, 1 to 3 wt. % phosphoric acid and the balance water in a slurry mixing zone;
   (b) preheating or cooling said aqueous dispersion in a temperature conditioning zone to a process temperature to produce a temperature conditioned mixture of 0° to 90° C.;
   (c) injecting a hydrogen peroxide solution at a hydrogen peroxide entry zone downstream of said temperature conditioning zone;
   (d) continuously combining said temperature conditioned mixture from step (b) with a sufficient amount of said hydrogen peroxide solution for a peroxide to trioxide molar ratio of 2.0 to 2.5;
   (e) continuously and thoroughly mixing product from step (d) by flowing through a static mixer so as to initiate a reaction between the hydrogen peroxide solution and aqueous dispersion of antimony trioxide; and
   (f) flowing product from step (e) through a tubular reactor possessing sufficient residence time for the complete oxidation of anitmony trioxide to antimony pentoxide.

14. A continuous process according to claim 13 further comprising the start-up steps of:
   (g) injecting water into said slurry mixing zone and into said hydrogen peroxide entry zone prior to step (a);
   (h) converting to injection of said hydrogen peroxide at said hydrogen peroxide entry zone; and
   (i) following step (h), converting to injection of said aqueous dispersion at said slurry mixing zone.

* * * * *